United States Patent

Barber et al.

[11] Patent Number: 5,865,423
[45] Date of Patent: Feb. 2, 1999

[54] HIGH FLOW DIAPHRAGM VALVE

[75] Inventors: Patrick P. Barber, Kinnelon; Shiaw-wen Tai, Livingston, both of N.J.

[73] Assignee: Parker Intangibles, Inc., Wilmington, Del.

[21] Appl. No.: 986,564

[22] Filed: Dec. 5, 1997

Related U.S. Application Data

[60] Provisional application No. 60/052,288, Jul. 11, 1997.

[51] Int. Cl.⁶ ................................................. F16K 31/50
[52] U.S. Cl. ................................... 251/335.2; 251/335.1
[58] Field of Search ............................. 251/335.1, 335.2

[56] References Cited

U.S. PATENT DOCUMENTS

| | | |
|---|---|---|
| 1,316,585 | 9/1919 | Logan . |
| 1,693,407 | 11/1928 | Shand .................................. 251/335.2 |
| 1,749,774 | 3/1930 | McKay . |
| 2,051,350 | 8/1936 | Smith . |
| 2,061,028 | 11/1936 | Forbes et al. . |
| 2,388,046 | 10/1945 | Emrich . |
| 2,521,891 | 9/1950 | Beams . |
| 2,618,458 | 11/1952 | Fosbender . |
| 2,654,561 | 10/1953 | Trefil .................................... 251/335.2 |
| 2,665,105 | 1/1954 | Svabek, Jr. . |
| 2,699,801 | 1/1955 | Schleyer . |
| 2,702,686 | 2/1955 | Fortune . |
| 2,784,934 | 3/1957 | Paulius, Jr. et al. . |
| 2,812,777 | 11/1957 | Dahl . |
| 2,880,620 | 4/1959 | Bredtschneider . |
| 2,983,480 | 5/1961 | Greenlie . |
| 3,126,194 | 3/1964 | Franck . |
| 3,838,707 | 10/1974 | Wachowitz, Jr. . |
| 3,874,636 | 4/1975 | Bake et al. . |
| 3,979,105 | 9/1976 | Pool et al. . |
| 3,982,729 | 9/1976 | Tricini . |
| 4,171,792 | 10/1979 | Bass . |
| 4,199,850 | 4/1980 | Velan . |
| 4,231,549 | 11/1980 | Visalli . |
| 4,354,666 | 10/1982 | McHale . |
| 4,488,341 | 12/1984 | Scott et al. . |
| 4,510,960 | 4/1985 | Jennings et al. . |
| 4,606,374 | 8/1986 | Kolenc et al. . |
| 4,671,490 | 6/1987 | Kolenc et al. . |
| 4,684,106 | 8/1987 | Kolenc et al. . |
| 4,732,363 | 3/1988 | Kolenc et al. . |
| 4,828,219 | 5/1989 | Ohmi et al. . |
| 5,037,066 | 8/1991 | Kerger et al. . |
| 5,515,078 | 5/1996 | Wellener, III et al. . |
| 5,624,102 | 4/1997 | Nishimura et al. . |

FOREIGN PATENT DOCUMENTS

| | | |
|---|---|---|
| 0 418 557 | 3/1991 | European Pat. Off. . |
| 773533 | 4/1957 | United Kingdom . |
| 958810 | 5/1964 | United Kingdom . |

*Primary Examiner*—A. Michael Chambers
*Attorney, Agent, or Firm*—Anthony J. Casella; Gerald E. Hespos; Ludomir A. Budzyn

[57] ABSTRACT

A diaphragm valve is provided with a valve housing having an inlet passage extending into a chamber and an outlet passage extending from the chamber. A diaphragm is mounted to the valve housing for covering the valve chamber. The diaphragm is provided with an aperture extending centrally therethrough. A valve stem is mounted adjacent the diaphragm externally of the valve chamber, such that movement of the valve stem deflects the diaphragm. A valving element is disposed in the valve chamber and is threadedly engaged with the valve stem through the aperture in the diaphragm. A toroidal sealing bead on the valving element is sealingly engaged with portions of the diaphragm surrounding the aperture therein.

10 Claims, 3 Drawing Sheets

HIGH FLOW DIAPHRAGM VALVE

This application claims the benefit of U.S. Provisional application No. 60/052,288 filed Jul. 11, 1997.

BACKGROUND OF THE INVENTION

1. Field of the Invention

The subject invention relates to diaphragm valves intended to accommodate a high flow of gas.

2. Description of the Prior Art

A prior art diaphragm valve includes a valve housing having a valve chamber that typically is open to the outside of the valve housing. The valve housing may include threads surrounding the valve chamber. An inlet passage extends through the valve housing from an external location to the valve chamber. An outlet passage extends through the valve housing from the valve chamber to a second external location. Thus, a fluid may flow into the inlet passage through the valve chamber and out of the outlet passage. Pipes or tubes are connected to the inlet and outlet passages to accommodate this flow of fluid.

The prior art diaphragm valve further include a resiliently deflectable diaphragm that extends across the valve chamber in juxtaposed relationship to the inlet passage. The diaphragm may be formed from an elastomer or from a thin resiliently deflectable metal. The diaphragm is made from a material selected to prevent reaction with the fluid carried through the valve.

A valve stem is mounted to the valve housing and is engageable with an external surface region of the diaphragm. The valve stem is selectively movable toward and away from the inlet passage and causes the diaphragm to selectively move into or out of sealing engagement with regions of the valve housing surrounding the inlet passage. Thus, the valve stem can be moved toward the valve housing so that the diaphragm is deflected into sealing engagement with portions of the valve housing surrounding the inlet passage for preventing fluid flow through the valve. The valve stem then can be moved away from the valve housing to permit the diaphragm to deflect away from the inlet passage. Thus, fluid is permitted to flow from the inlet passage into the valve chamber and subsequently from the valve chamber into the outlet passage.

Some diaphragm valves are designed specifically for controlling the flow of liquids, while others are designed specifically to control the flow of gases. Many manufacturing processes require controlled amounts of very pure gases. Even, small amounts of ambient gas or other contaminants can adversely affect the manufacturing process. The components of such gas flow systems are manufactured and assembled in ultra clean environments. Fittings and valves for such systems typically are made entirely from metal and must positively prevent seepage of ambient air into the very pure supply of gas accommodated by the system.

Diaphragm valves are well suited for fluid systems that are intended to accommodate pure gases. However, the metal diaphragm of a diaphragm valve is capable of generating only a relatively small amount of deflection. As a result, prior art diaphragm valves have not been well suited for high flow fluid systems. The flow of fluid through a diaphragm valve theoretically can be increased by merely increasing the cross-sectional dimensions of the inlet passage, the outlet passage and the valve chamber. However, a prior art diaphragm valve must be sufficiently deflectable to seal entirely around such a large inlet passage. The metal diaphragm of a prior art diaphragm valve would have to be positioned very close to such a large inlet passage to effectively seal the entire inlet passage with the limited amount of deflection that is possible with a diaphragm. Thus, even though a fairly large inlet passage can be provided, the actual flow through a prior art diaphragm valve would be restricted by the close proximity of the diaphragm to the inlet passage.

Some prior art diaphragm valves have secured a rigid valving member to the side of the diaphragm facing the valve chamber. The rigid valving member is selectively moved by the diaphragm into and out of sealing engagement with portions of the valve chamber surrounding the inlet passage. Prior art diaphragm valves of this type often are referred to as tied diaphragm valves and are intended to achieve both a high flow and a good quality seal around a fairly large inlet passage. In particular, it has been assumed that the valving member secured to and moved with the diaphragm can achieve better sealing around a large inlet passage than the metal diaphragm could achieve without the benefit of thee valving element. Tied diaphragm valves are used successfully in some fluid systems. However, fluid systems intended for highly pure gas flows often cannot tolerate the presence of a weld area in the gas stream. The weldment creates the potential for contamination and defines a potential weak point that can lead to a costly failure of the valve.

Other tied diaphragm valves merely include a threaded bolt that passes axially through the rigid valving member, through the diaphragm and into the valve stem. However, valves of this type create the potential for contaminating air to flow into the valve chamber through microscopic spaces that may exist between the bolt and the valve element.

In view of the above, it is an object of the subject invention to provide a high flow diaphragm valve that is well suited for high volume fluid flows.

It is another object of the subject invention to provide a diaphragm valve that can permit high volume flows while maintaining high purity.

It is a further object of the subject invention to provide a diaphragm valve with a valving element fixed to portions of the diaphragm in the valve chamber without welding.

A further object of the subject invention is to provide a diaphragm valve with a valving element attached to portions of the diaphragm in the valve chamber without providing a passage through the valve element for tieing the valve element to the diaphragm and the valve stem.

SUMMARY OF THE INVENTION

The subject invention is directed to a high flow, high purity diaphragm valve. The valve includes a valve housing unitarily formed and/or machined from a metallic material. The valve housing includes a valve chamber formed therein and opening externally from the valve housing. Portions of the valve housing surrounding the valve chamber may include an array of threads for threadedly receiving a bonnet into which a valve stem may be engaged. The valve housing further includes an inlet passage extending from an external location on the valve housing into the valve chamber. Portions of the inlet passage extending into the valve chamber are cylindrical and are axially generated with the walls of the valve chamber and with the threads for threadedly, attaching a bonnet to the valve housing. Portions of the valve housing at the interface of the valve chamber and the inlet passage may define a toroidal bead. The toroidal bead is defined as a smoothly arcuate convex surface rotated around the axis of the inlet passage. The valve housing further includes an outlet passage extending from the valve chamber to an external region.

The valve of the subject invention further includes a nut threadedly engaged with the thread surrounding the valve chamber. The nut may include a central aperture extending axially therethrough for receiving a valve stem. The central aperture may be threaded so that the valve stem moves axially relative to the nut and relative to the valve housing in response to rotational movement of the valve stem.

The valve further includes a toroidal or ring-shaped diaphragm securely engaged between the valve housing and the nut. The toroidal diaphragm is formed from a resiliently deflectable metal material and, in an unbiased condition, may be of dished configuration with a concave surface facing into the valve chamber and a convex surface facing outwardly therefrom. Central portions of the toroidal or ring-shaped diaphragm include an aperture extending therethrough.

The valve of the subject invention further includes an actuator movably engaged in the nut and having an end engaged against the convex surface of the diaphragm. The actuator may include a valve stem that is threadedly engaged with the threaded central aperture of the nut so that rotational movement of the valve stem generates axial movement relative to the nut and the valve housing.

The actuator may include a projection passing through the aperture in the toroidal diaphragm. The projection and the actuator may be unitarily formed. However, the projection preferably is on a separate button that can float radially relative to the valve stem. Portions of the projections disposed within the valve chamber preferably are threaded.

The valve of the subject invention further includes a valving element disposed in the valve chamber and securely engaged with the projection passing from the actuator through the aperture in the diaphragm and into the valve chamber. More particularly, the valving element may include a central threaded aperture extending partly into the valving element. The threaded aperture may be threadedly engaged with threaded portions of the projection extending from the actuator or button through the diaphragm and into the valve chamber. The threaded aperture preferably does not extend entirely through the valving element. Portions of the valving element surrounding the threaded aperture define a toroidal sealing bead. The toroidal sealing bead preferably is defined as, a smoothly arcuate convex surface rotated about the axis of the aperture extending into the valving element. The toroidal sealing bead on the valving element is urged into tight sealing engagement with the diaphragm as the valving element is threadedly engaged tightly with the projection from the actuator or button. Thus, a secure fluid tight seal is achieved by the toroidal sealing bead of the valving element against the diaphragm and positively prevents leakage.

Portions of the valving element opposite the mounting aperture define a sealing face for tight sealing engagement with the toroidal sealing bead of the valve housing surrounding the interface of the inlet passage and valve chamber. This sealing face may be formed unitarily from metal to achieve a circular line sealing contact between the sealing face of the valving element and the toroidal sealing bead unitarily formed in the valve body. Alternatively, in certain embodiments, the sealing face of the valving element may be machined with an annular undercut which receives a separate sealing element. The separate sealing element may be a different type of metal or may be a non-metallic material that is inert in the presence of the gas being transported through the valve.

The valve of the subject invention enables a high volume gas flow therethrough while still enabling secure sealing. Furthermore, the valve provides an efficient and effective fluid tight seal between the valving element and the diaphragm, thereby avoiding the potential of an inflow of contaminants and avoiding a direct exposure to a weldment.

The valve is opened entirely by the inherent resiliency of the diaphragm. More particularly, movement of the valve stem upwardly permits the diaphragm to resiliently return to the dished unbiased configuration. Thus, the diaphragm is not stressed during normal flow conditions of the valve. The valve does not require springs to pull the diaphragm upwardly and effectively isolates the diaphragm from rotational movement of the valve stem that is inherent in a manually operated valve. Additionally, the dished configuration of the valve increases the volume of the valve chamber to accommodate a high flow of gas through the valve.

DETAILED DESCRIPTION OF THE PREFERRED EMBODIMENT

Figure 1:
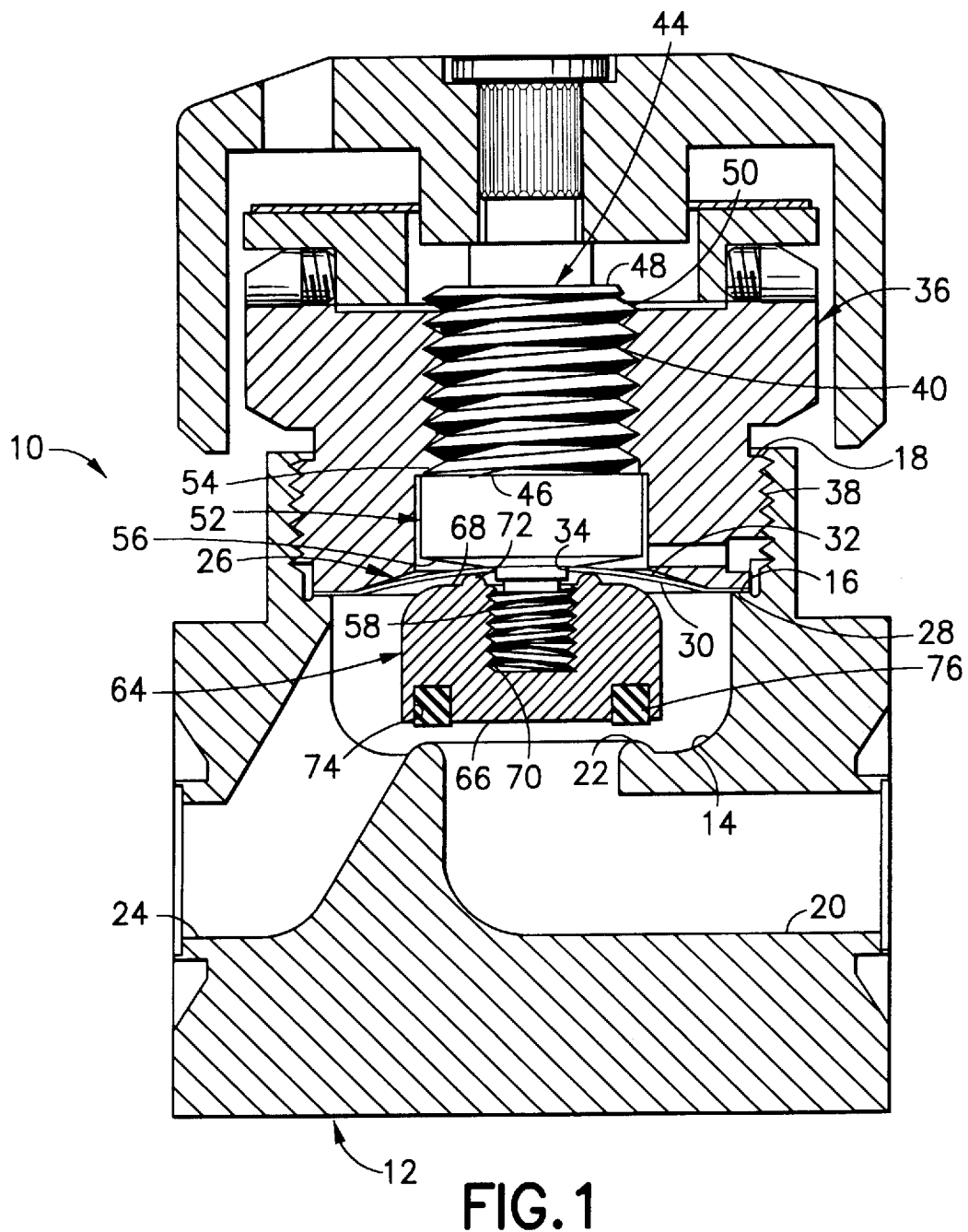
FIG. 1 is a longitudinal cross-sectional view of a valve in accordance with the subject invention.

A valve in accordance with the subject invention is identified generally by the numeral 10 in the FIG. 1. The valve 10 includes a valve housing 12 unitarily formed from a metallic material, such as stainless steel. The valve housing is formed to include a valve chamber 14 extending into an external surface area of the valve housing 12. The valve chamber 14 is substantially cylindrical and is generated about an axis extending orthogonally into an external surface region of the valve housing 12. The valve chamber 14 is characterized by an annular diaphragm seat 16 extending orthogonally to the axis about which the substantially cylindrical valve chamber 14 is formed. An array of threads 18 extends concentrically from the valve seat 16 toward external regions of the valve housing 12. As depicted herein, the threads 18 are internally generated. However, an array of external threads can be provided with minor modifications to the valve design described herein.

The valve housing 12 further includes an inlet passage 20 extending from an external location on the valve housing 12 into the valve chamber 14. Portions of the inlet passage 20 extending into the valve chamber 14 are cylindrical and are generated about an axis that is coincident with the axis about which the valve chamber 14 is generated.

The interface of the inlet passage 20 and the valve chamber 14 is defined by an annular toroidal sealing bead 22 that is unitary with the valve housing 12. More particularly, the toroidal sealing bead 22 is defined by a semi-circle rotated about the axis of the valve chamber 14 and/or about portions of the inlet passage 20 extending into the valve chamber 14.

The valve housing 12 further includes an outlet passage 24 extending from the valve chamber to an external location on the valve housing 12. Thus, a fluid, and particularly a gaseous fluid, may flow through the inlet passage 20 into the valve chamber 14 and subsequently from the valve chamber 14 through the outlet passage 24.

Figure 2:
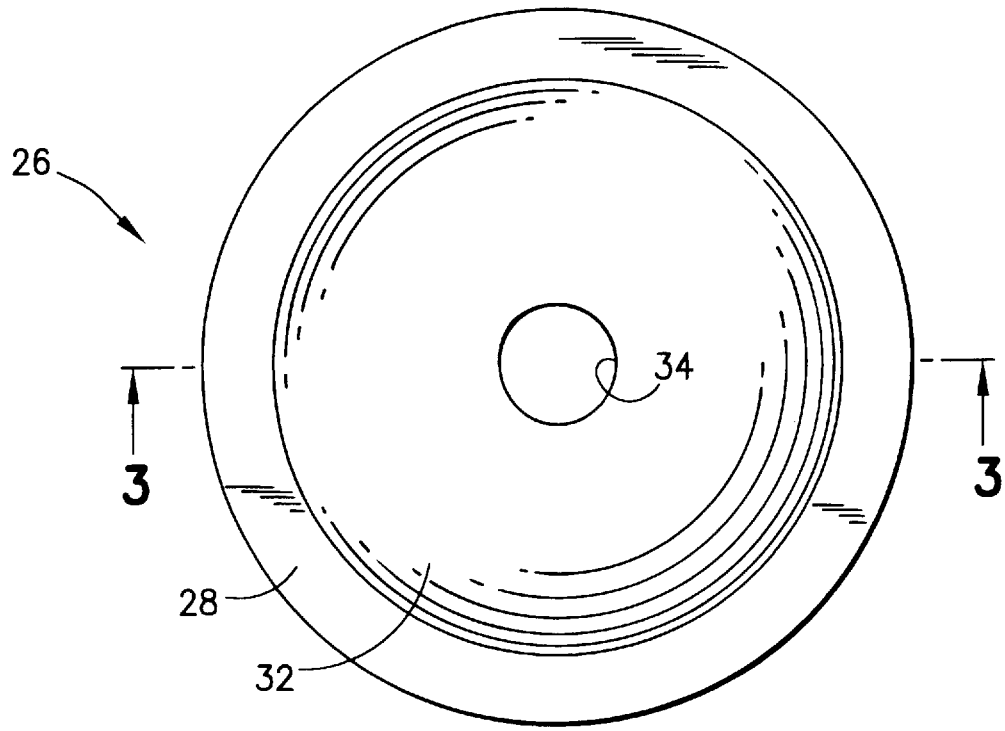
FIG. 2 is a top plan view of the diaphragm of the subject invention.
Figure 3:
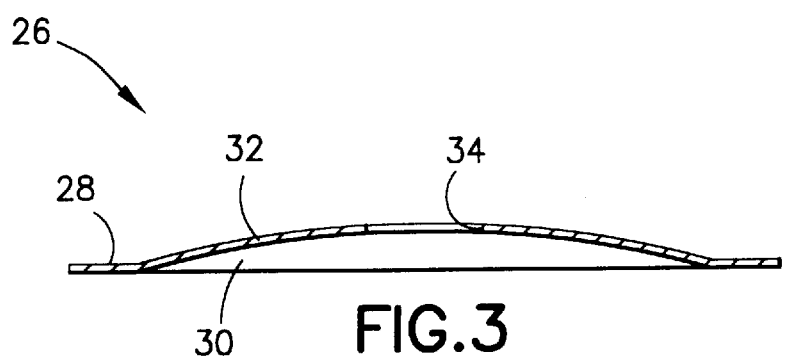
FIG. 3 is a cross-sectional view taken along line 3—3 in FIG. 2.

The valve 10 further includes a metallic diaphragm 26 having a planar annular seating portion 28 positioned on the diaphragm seat 16 of the valve housing 12 as shown in FIG. 1. Portions of the diaphragm 26 internally from the planar annular seating portion 28 are of dished configuration to form a concave inner surface 30 and a convex outer surface 32 as shown in FIGS. 2 and 3. The diaphragm 26 is further provided with a central aperture 34 extending therethrough. Thus, the diaphragm 26 is toroidal or ring-shaped.

The diaphragm 26 is securely held against the diaphragm seat 16 by a metallic nut 36. More particularly, the nut 36 includes an array of external threads 38 securely threadedly engaged with the internal threads 18 on the valve housing 12. The nut 36 further includes a passage 40 extending axially therethrough. At least portions of the passage 40 are internally threaded.

The valve 10 further includes a metallic valve stem 44 having an inner end 46 and an opposed outer end 48. Portions of the valve stem 44 between the inner and outer ends 46 and 48 are provided with an array of external threads 50 that threadedly engage with the internal threads 42 of the nut 36. Thus, rotation of the valve stem 34 about its longitudinal axis will cause the threads 50 thereon to interact with the internal threads 42 on the nut 36, and will thereby cause axial movement of the valve stem 44 relative to the nut 36 and relative to the valve housing 12.

Figure 4:
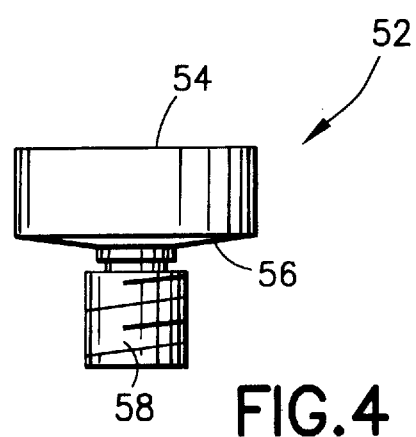
FIG. 4 is a side elevational view of the button that is disposed between the valve actuator and the diaphragm.
Figure 5:
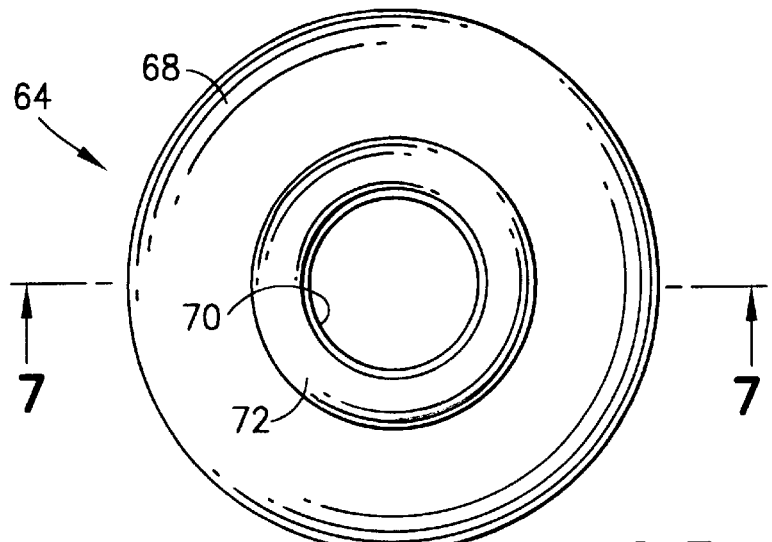
FIG. 5 is a top plan view of the valving element.
Figure 6:
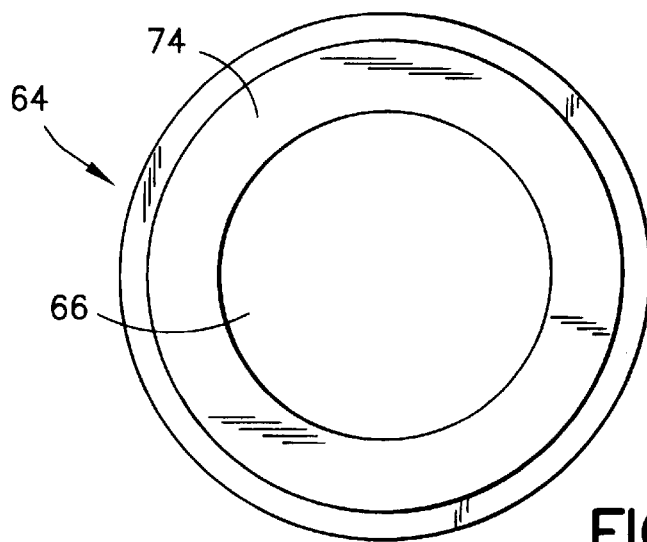
FIG. 6 is a bottom plan view of the valving element.
Figure 7:
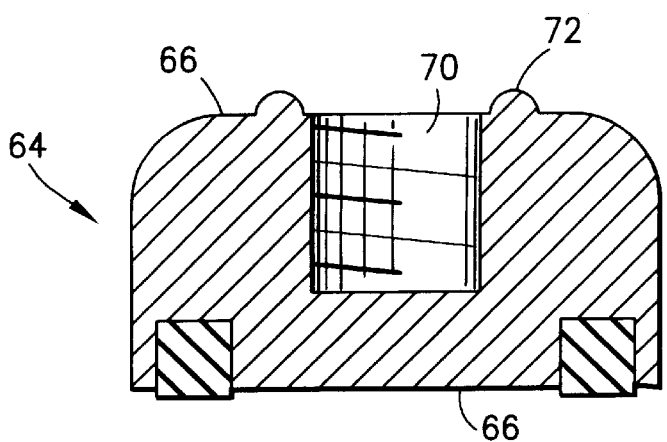
FIG. 7 is a cross-sectional view taken along line 7—7 in FIG. 5.

A metallic button 52 is disposed between the internal end 46 of the valve stem 44 and the convex surface 32 of the diaphragm 26 as shown in FIG. 1. The button 52 includes opposed first and second ends 54 and 56 as shown in FIGS. 1 and 4. The first end 54 of the button 52 is substantially planar, and is in sliding engagement against the inner end 46 of the valve stem 44. The second axial end 56 of the button 52 is slightly arcuately convex and is positioned adjacent the convex surface 32 of the diaphragm 26. Significantly, the second end 56 of the button 52 is not welded to the diaphragm 26. A threaded projection 58 projects axially from the convex surface at the second end 56 of the button 52 and passes through the aperture 34 in the diaphragm 26 and into the valve chamber 14. The threaded projection 58 preferably is unitarily formed with remaining portions of the button 52.

The valve 10 further includes a short cylindrical valving element 64 formed from a metallic material. With reference to FIGS. 1 and 5–7, the valving element 64 includes a sealing end 66 and an opposed mounting end 68. The mounting end 68 is characterized by an internally threaded aperture 70 extending from, the mounting end 68 partway toward the sealing end 66 of the valving element 64. The internal threads of the aperture 70 are securely threadedly engaged with the threaded projection 58 of the button 52. The mounting end 68 of the valving element 64 is further characterized by an annular toroidal sealing bead 72 surrounding the threaded aperture 70. The toroidal sealing bead 72 is defined by a semi-circle rotated about the axis of the valving element 64. The toroidal sealing bead 72 functions to tightly seal the valving element 64 to the concave inner surface 30 of the diaphragm 26. More particularly, threaded tightening of the valving element 64 onto the threaded projection 58 of the button 52 causes the toroidal sealing bead 72 to be urged into tight sealing engagement with the concave inner surface 30 of the diaphragm 26.

The sealing end 66 of the valving element 64 is generally planar, but is provided with an annular recess 74 extending therein at a location substantially registered with the toroidal sealing bead 22 of the valve housing 12. A sealing element 76 is securely received in the annular recess 74 and is dimensioned and disposed to register with the toroidal sealing bead 22 of the valve housing 12. The sealing element 72 is formed from a material that will achieve a high quality seal without reacting with the gas flow in the valve.

The connection of the valving element 64 to the button 52 provides a high quality fluid tight seal suitable for highly pure gas flows. In particular, the tight engagement of the toroidal sealing bead 72 with the concave face 30 of the diaphragm 26 avoids the objectionable use of weldments, and further avoids the need for a through hole extending from the valve chamber. Rather, the threaded connection between the valving element 64 and the projection 58 from the button 52, including the aperture 34 through the diaphragm 26, is safely sealed within the bounds of the toroidal sealing bead 72 on the valving element 64.

The valve 10 is employed by rotating the valve stem 44 into the condition shown in the Fe. This movement of the valve stem 44 permits the diaphragm 26 to resiliently return to the unbiased configuration shown in the FIG. 1. Movement of the diaphragm into the unbiased dished configuration simultaneously moves the button 52 such that the first axial end 54 of the button 52 remains in abutting face-to-face engagement with the inner end 46 of the valve stem 44. However, the axial movement of the valve stem 44 does not pull the button 52 and does not generate rotation in the button 52. Movement of the diaphragm 26 into the unbiased dished configuration shown in the FIG. 1 also causes the valving element 64 to be spaced from the toroidal sealing bead 22 on the valve body 12. In this illustrated condition, the sealing surface 66 of the valving element 64 is spaced from the toroidal sealing bead 22, thereby enabling a high volume flow of fluid, and preferably gaseous fluid, from the inlet passage 20, through the valve chamber 14 and out of the outlet passage 24.

The valve 10 can be closed by rotating the valve stem 44 such that the inner end 46 of the valve stem 44 moves toward the valve chamber 14, thereby urging the button 52 axially toward the chamber 14 and deflecting the diaphragm 26 inwardly. This movement of the valve stem 44 and the corresponding inward deflection of the diaphragm 26 causes the valving element 64 to move into the valve chamber 14 and toward the toroidal sealing bead 22 of the valve housing 12. Sufficient movement will cause the annular seal 76 of the valving element 64 to sealingly engage the toroidal sealing bead 22 of the valve housing 12. Throughout this movement of the valving element 64, the toroidal sealing bead 72 of the valving element 64 will remain in tight sealing engagement with the concave inner surface 30 of the diaphragm 26. Thus, a high quality seal that is suitable for highly pure gas flows can be achieved.

While the invention has been described with respect to certain preferred embodiments, it is apparent that various changes can be made without departing from the scope of the invention as defined by the appended claims. In particular, the valve housing 12 may include an array of external threads for threaded engagement with internal threads on a bonnet. Additionally, the valve need not be manually operated as depicted herein. Rather, the valve may include an automatic actuator. These and other changes will be apparent to a person skilled in this art after having read the subject disclosure. Furthermore, a different connection of the valving element to the valve stem may be provided. For example the valving element may include a threaded projection that engages in a threaded aperture in the valve stem.

What is claimed is:

1. A diaphragm valve comprising:
   a valve housing having a valve chamber, an inlet passage extending into said valve chamber and an outlet passage extending out of said valve chamber;
   a resiliently deflectable metal diaphragm secured to said valve housing and substantially enclosing said valve chamber, said diaphragm having a central aperture extending therethrough;
   an actuator adjacent said diaphragm and externally of said valve chamber, said actuator being selectively movable in said valve housing toward and away from said valve chamber; and
   a valving element disposed in said valve chamber and having a sealing end disposed in juxtaposed relationship to said inlet passage, said valving element having a mounting end with an annular toroidal sealing bead sealingly engaged with portions of said diaphragm surrounding said aperture therethrough, whereby movement of said actuator selectively urges said sealing face of said valving element into sealing engagement with portions of said valve body surrounding said inlet passage.

2. The valve of claim 1, further comprising a connection extending from said actuator to said valving element through said aperture in said diaphragm.

3. The valve of claim 2, wherein the connection is a threaded connection for tightly urging said annular toroidal sealing bead of said valving element into sealing engagement with portions of said diaphragm surrounding said aperture.

4. The valve of claim 3, wherein the threaded connection includes a threaded projection extending from said actuator through said aperture in said diaphragm, said threaded connection further comprising a threaded recess extending into said valving element and concentrically surrounded by said annular toroidal sealing bead of said valving element.

5. The valve of claim 1, wherein the actuator comprises a valve stem engaged in said valve housing for movement toward and away from said valve chamber, said valve stem including an inner end facing said valve chamber, said actuator further comprising a button having a first portion slidably engaged with said inner end of said valve stem and a second portion engaging a surface of said diaphragm adjacent said aperture therethrough and facing away from said valve chamber.

6. The valve of claim 5, wherein a selected one of the button and the valving element includes a projection extending through the aperture in the diaphragm for threadedly connecting said button to said valving element and for tightly urging said annular toroidal sealing bead of said valving element into sealing engagement with portions of said diaphragm surrounding said aperture therethrough.

7. The valve of claim 1, wherein the diaphragm, in an unbiased condition, is of a dished shape with a concave surface facing said valve chamber and a convex surface facing said actuator.

8. The valve of claim 7, wherein the actuator includes a convex surface engaging said convex surface of said diaphragm substantially adjacent said aperture through said diaphragm.

9. The valve of claim 8, wherein the actuator includes threaded means substantially registered with said aperture in said diaphragm, and wherein said valving element includes threaded means substantially registered with said aperture through said diaphragm, the threaded means of the actuator and the threaded means of the valving element being for threaded interconnection with one another for securely urging the annular toroidal sealing bead of said valving element into sealing engagement with portions of said diaphragm surrounding said aperture therethrough.

10. The valve of claim 9, wherein said actuator includes a valve stem having an inner end facing said diaphragm and a button movably engaged with said inner end and engaged with said diaphragm, whereby relative movement between said valve stem and said button prevents movement of said valve stem from being transmitted to said diaphragm.

* * * * *